United States Patent [19]

Plummer

[11] 4,293,892
[45] Oct. 6, 1981

[54] ZOOM LIGHT APPARATUS

[75] Inventor: William T. Plummer, Concord, Mass.

[73] Assignee: Polaroid Corporation, Cambridge, Mass.

[21] Appl. No.: 104,860

[22] Filed: Dec. 18, 1979

[51] Int. Cl.³ .............................................. G03B 15/02
[52] U.S. Cl. ......................................... 362/17; 362/18; 362/268; 362/331
[58] Field of Search ................... 362/17, 18, 331, 268

[56] References Cited
U.S. PATENT DOCUMENTS
4,158,222  6/1979  Cook ................................... 362/331

Primary Examiner—Stephen J. Lechert, Jr.
Attorney, Agent, or Firm—Francis J. Caufield

[57] ABSTRACT

A zoom lighting device for projecting a generally rectangular illumination pattern whose size can be selectively changed. The device comprises a paraboloidal reflector and an artificial light source which cooperate to provide a collimated to nearly collimated beam of light which is circular in cross-section. The circularly-shaped light beam is intercepted by a pair of movably mounted crossed lenticular screens that are optically structured to change the circularly-shaped beam to a diverging generally rectangularly-shaped beam whose angles of divergence can be selectively changed by moving the screens relative to one another.

28 Claims, 8 Drawing Figures

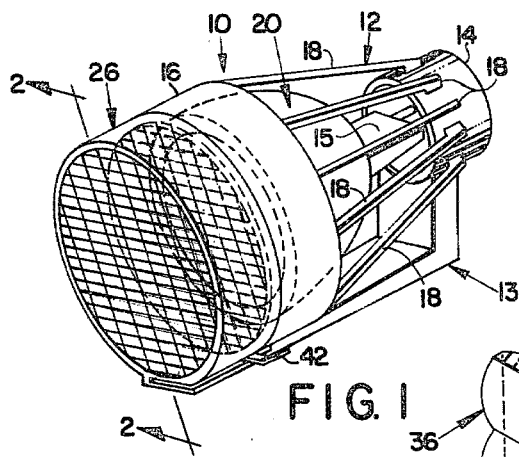
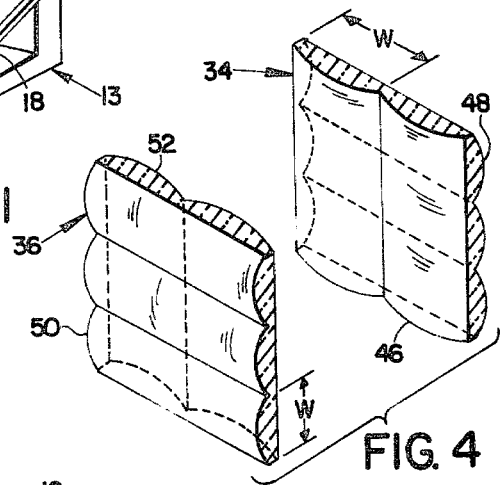
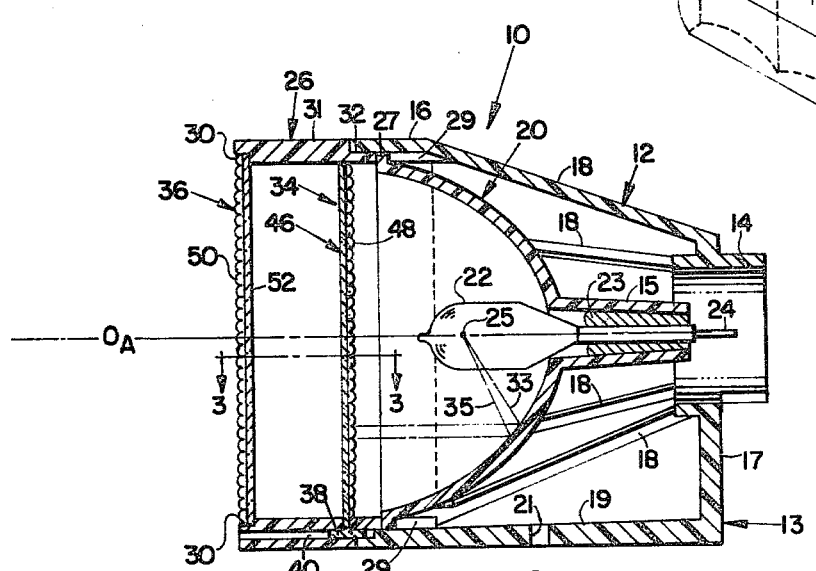
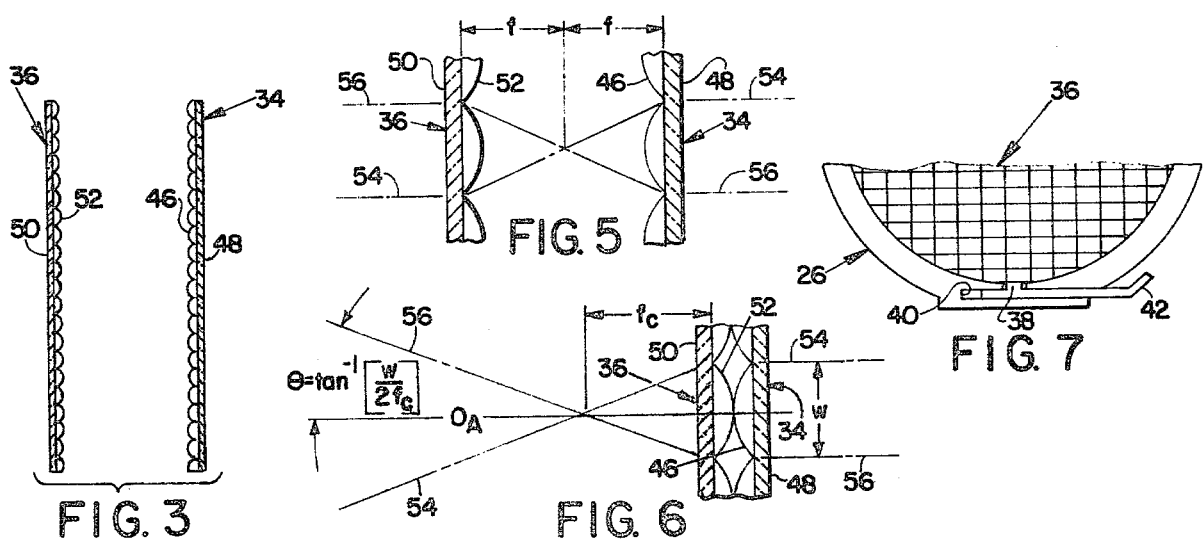

ZOOM LIGHT APPARATUS

BACKGROUND OF THE INVENTION

1. Field of the Invention

This invention generally relates to artificial lighting devices which are useful in photographic applications and particularly to a zoom lighting device having optical light control apparatus by which the divergence of a light beam can be selectively changed to illuminate of different rectangular size.

2. Description of the Prior Art

Electronic strobes, flashguns, spotlights, floodlights, and the like are all well-known artificial lighting devices which usually comprise a light source and an associated reflector that cooperate in a well-known manner to project a beam of light within a predetermined solid angle. The solid angle of the projected light beam depends on the reflector shape, the light source geometry, and the position of the light source, usually fixed, relative to the reflector. Thus, a given reflector and light source have the limitation that the light beam therefrom is projected within only one solid angle. Those skilled in the art have recognized this limitation and have provided light control apparatus by which the inherent solid angle of the light beam from such devices can be changed to thereby improve their versatility.

Examples of such prior art optical light control apparatus include diffusion (light scattering) screens as shown and described in U.S. Pat. No. 3,167,256 issued to F. P. Elliot on Jan. 26, 1965 and entitled "Photographic Flash Apparatus" and U.S. Pat. No. 3,860,812 issued to Arthur Schneider on Jan. 14, 1975 and entitled "Diffusion Screen For Photographic Lighting." In Elliot, the patentee shows an electronic strobe adapted to receive a light scattering "lens" that can be manually inserted therein in the path of the strobe light beam to increase the divergence of the light beam emerging therefrom. Schneider also shows a diffusing screen for a similar purpose, but it is not necessary in Schneider to manually change the screen because the diffusion thereof is effected by laterally displacing one optical plate (layer) with respect to another. However, neither of these patents appear to disclose structure for continuously varying the light beam angle of divergence and are thus not as versatile as others which can.

Examples of optical apparatus for selectively controlling the angular spread of a light beam by reducing its inherent angle of divergence are shown and described in U.S. Pat. No. 3,404,612 issued to D. M. Harvey on Oct. 8, 1968 and entitled "Light Regulation Means For Use With Multilamp Flash Units;" U.S. Pat. No. 4,017,727 issued to David J. Tamanoto on Apr. 12, 1977 and entitled "Light Projecting Apparatus;" and U.S. Pat. No. 4,141,059 issued to Shosaki Shiojiri on Feb. 20, 1979 and entitled "Photographic Flash Device." All of these patents in principle use a positive lens, which can be a Fresnel lens, to converge a diverging light beam to thereby reduce its angular spread. This is done by moving the lens axially with respect to the beam. Apparently, relatively large axial displacements are required to effect divergence changes with this type of apparatus and such apparatus tend to be somewhat large and awkward to use.

Another prior art device is described in U.S. Pat. No. 3,484,599 issued to W. D. Little on Jan. 3, 1967 and entitled "Optical Projection Apparatus." Here the patentee shows the use of two spaced apart lenticulated screens mounted for rotation with respect to one another to expand the divergence of a collimated beam from a circular spot to a larger circle of light. In between the small and large circular patterns, the device produces elliptical patterns, but because of this, the device is inefficient for photographic applications requiring the illumination of rectangular formats.

In U.S. Pat. No. 4,101,957 issued to Bansun Chang on July 18, 1978 and entitled "Zoom Operating Light," the patentee discloses an operating light useful in dentistry and medical applications. The size of an illuminated rectangle is changed by imaging it at different magnifications at relatively short conjugates, 13 inches and 32 inches. The areas illuminated are relatively small and therefore would not be suitable for illuminating larger areas commonly found in photographic work. Also, the zoom light disclosed appears to be somewhat large and bulky.

From the foregoing review of the prior art, there can still be seen to exist a need for a versatile artificial lighting device which can provide a light beam whose divergence can be continuously changed in a controllable manner through the use of simplified, compact structure and a primary object of the present invention is to provide such a device.

Another object of the present invention is to provide light controlling structure by which a circular collimated light beam can be continuously expanded to provide generally rectangular illumination patterns at subject distances commonly used in photographic applications.

It is yet another object of the present invention to provide light control apparatus which can effect the foregoing objects with relatively small displacements of its parts.

Other objects of the invention will in part be obvious and will in part appear hereinafter. The invention accordingly comprises the apparatus possessing the construction, the combination of elements, and arrangement of parts which are exemplified in the following detailed disclosure.

SUMMARY OF THE INVENTION

This invention in general relates to artificial lighting apparatus and in particular to a zoom lighting apparatus having optical light control apparatus by which the angular spread of a light beam projected therefrom can be selectively controlled to illuminate areas of different rectangular sizes.

The preferred embodiment of the zoom lighting apparatus of the invention comprises an open-ended paraboloidal reflector having an artificial light mounted approximate the focus thereof. The reflector and light source are especially structured to cooperate to provide a collimated or nearly collimated light beam which emerges from the open end of the reflector and has a generally circular cross-section.

Also included in the invention are a pair of optical refracting elements and means for positioning the refracting elements in the emerging light beam so that the light from the beam pass successively through the refracting elements and for mounting the refracting elements for relative movement with respect to one another along an axis parallel to the general direction of projection of the light beam.

Means are included in the invention for facilitating the displacement of the optical refracting elements relative to one another.

The refracting elements are optically structured to convert the circular cross-section of the beam of light into a light beam which has a generally rectangular cross-section with preselected angles of divergence, measured in mutually orthogonal horizontal and vertical planes, when the refracting elements are separated by a predetermined distance along their axis of movement and to continuously increase the divergence of the preselected angles of the rectangularly shaped light beam as the distance separating the refracting elements is made smaller than the predetermined separation distance.

The optical refracting elements of the invention each preferably comprise a thin, plate-like, crossed lenticular screen each of which is mounted so that the major dimensions thereof always lie in a plane that is perpendicular to the axis along which the screens are adapted to move, and all of the lenticules of the screens are preferably cylindrical lenses.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

FIG. 1 is a perspective view of the zoom lighting apparatus of the invention;

FIG. 2 is an enlarged sectional view of the invention taken generally along line 2—2 of FIG. 1;

FIG. 3 is a sectional view of part of the invention taken generally along line 3—3 of FIG. 2;

FIG. 4 is an enlarged fragmentary perspective view of parts of the invention shown in FIGS. 1 and 2;

FIG. 5 is an enlarged fragmentary view of the parts of the invention shown in FIG. 3;

FIG. 6 is similar to FIG. 5 and shows the parts illustrated in FIG. 5 in a different position;

FIG. 7 is a front fragmentary view of parts of the invention; and

DESCRIPTION OF THE PREFERRED EMBODIMENT

Figure 8:
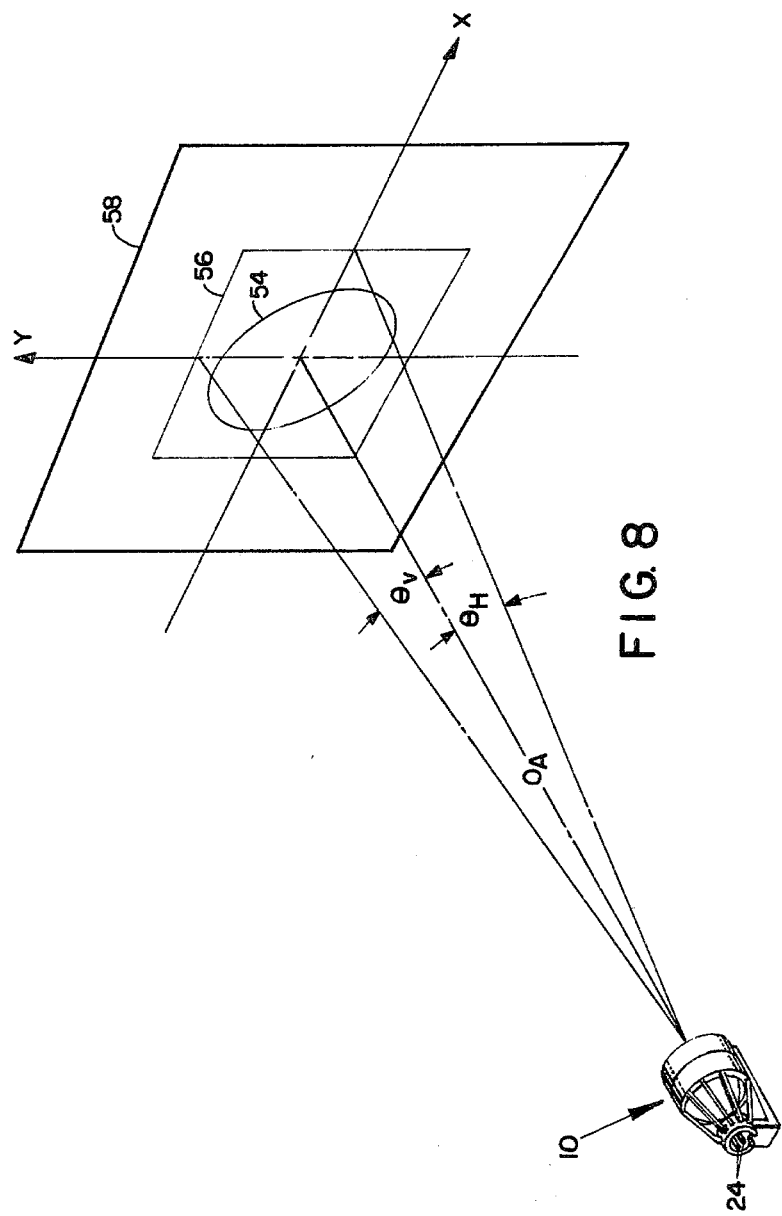
FIG. 8 is a perspective view illustrating diagrammatically a range of rectangular areas that can be illuminated by a light beam when projected by the invention onto a plane perpendicular to the direction of projected light and includes for comparison a circular area that would be illuminated by only part of the invention which includes a reflector and artificial lamp combination.

Referring now to FIGS. 1 and 2, there is shown at 10 the preferred embodiment of the zoom lighting apparatus of the invention. The apparatus 10 comprises a generally conical-shaped reflector support element 12, an open-ended paraboloidal reflector 20 disposed in the element 12, an artificial light source 22 disposed within the reflector 20, and a light control section 26 located forward of the open end of the reflector 20.

The element 12 comprises a pair of concentric cylindrical rings including a ring 16 behind which is spaced a smaller diameter ring 14. Connecting the rings, 14 and 16, are a plurality of elongated bars 18 that are angled with respect to the axis, OA, and have their opposite ends attached to and equally spaced around respective outer circumferences of the rings, 14 and 16. Structured in the foregoing manner, the element 12 comprises a cagelike structure adapted to receive therein the reflector 20.

The cage-like element 12 sits an L-shaped bracket 13 which has a vertically extending leg 17 connected with the bottom of the ring 14 and a horizontally extending leg 19 which is connected to the bottom of the ring 16. A bolt hole 21 is provided in the horizontal leg 19 for the purpose of fixedly attaching or mounting the apparatus 10 to a structure, e.g., a camera or the like, with which it can be used.

Provided on the inside surface of the ring 16 are a plurality of circumferentially spaced apart ribs 29 (FIG. 2) the forwardly facing (to the left) surfaces of which define a plane against which the rear surface of a flange 27 of the reflector 20 seats. The light control section 26 includes a cylindrical tubular section 31 that is provided with a rear end section 32 whose diameter is dimensioned to fit into the ring 16 and whose axial length is selected so that the reflector flange 27 is trapped between the ribs 29 and the end section 32 to thereby support the reflector within the cage-like element 12 in cantilevered fashion.

The artificial light source 22, which includes a filament 25 and a pair of leads 24 (FIG. 8), is preferably an 85 watt, 60 volt tungsten halogen lamp having a correlated color temperature of approximately 3300° K. Included in the reflector 20 is a rearwardly extending tubular section 15 through which the rear end of the lamp 22 extends. The lamp 22 is fixedly mounted in the reflector section 15 through the use of a ceramic material 23 such that the lamp filament 25 is located proximate the focus of the reflector 20 and the leads 24 are accessible through the ring 14 for purposes of facilitating connection with a power cord receptacle (not shown).

The reflector 20 is preferably fabricated of clear Pyrex and the interior surface thereof is provided in a well-known manner with a thin dichroic coating (not illustrated) that reflects visible radiation and transmits infrared radiation incident thereto. The dichroic property of the reflector 20 provides a means for dissipating heat from the lamp 22 by transmitting its IR content through the reflector rear exterior surface and into the ambient environment through the open spaces in the cage-like structure 12.

The reflector 20 and the lamp 22 are optically structured in a well-known manner so that light rays from the filament 25 are collimated or nearly collimated by the reflector 20 in a well-known manner to provide a beam of light which has a generally circular cross-section as it emerges from the reflector open end. FIG. 2 illustrates the collimation action of the reflector 20 on two rays, 33 and 35, which are assumed to originate from a point on the lamp filament 25 which is exactly at the reflector focus. As can be seen from FIG. 2, the rays, 33 and 35, pass through the reflector open end parallel to the axis, OA. However, all rays from the filament 25 do not originate exactly from the focus of the reflector 20 because the filament 25 necessarily is of some finite size. Therefore rays from those parts of the filament 25 which are not exactly at the reflector focus diverge slightly from the axis, OA, as they pass through the reflector open end. As a consequence of this divergence, the diameter of the beam of light emerging from the reflector open end becomes large in correspondence with the distance (along the axis, OA) over which the beam is projected. The divergence of the circular beam emerging from the reflector open end is related to the ratio of the size of the filament 25 and the focal length of the reflector 20. The focal length of the reflector 20 and the geometry of the lamp filament 25 are preferably selected so that the amount of angular divergence of the light beam emerging from the reflector open end is such that its circular area, when projected onto a perpendicular plane located at the nearest projection distance for the apparatus 10, is smaller than a rectangular area to be illuminated at the same distance by the apparatus 10 of this invention in its entirety as will be subsequently described. This is illustrated diagrammatically in FIG. 8 wherein the X—Y axis represents the perpendicular plane, circle 54 represents the area of the collimated beam from the reflector open end projected onto the X—Y plane, and the rectangle 56 represents the smallest rectangular are which the apparatus 10 of this invention can illuminate.

In a manner to be described, the apparatus light control section 26 is optically structured to convert, at all projection distances, the circular cross-sectioned collimated light beam emerging from the reflector open end into a beam of light having a generally rectangular cross section with preselected angles of divergence which can be selectively increased to thereby illuminate increasingly larger rectangular areas. By virtue of this optical structure, the apparatus light control section 26 can convert the circular area 54 of FIG. 8 to the rectangular area 56 which has preselected angles of divergence, $\theta_H$ and $\theta_V$, measured respectively in mutually orthogonal horizontal and vertical planes. In addition, the light control section 26 can also further increase the angles, $\theta_H$ and $\theta_V$, to illuminate a larger rectangular area as represented by the rectangle 58 in FIG. 8. The optical properties of the light control section 26 can best be understood by now referring to FIGS. 1–4 wherein it can be seen that the apparatus light control section 26 comprises a pair of optical light refracting elements, 34 and 36, that are generally circular in shape. The element 36 is fixedly mounted in a well-known manner in a complementary configured bore 30 (FIG. 2) that is provided in the forward end of the cylindrical section 31 to receive the element 36. As best shown in FIGS. 2 and 7, the element 34 is attached to a block 38 that is slidably mounted in an elongated groove 40. Connected with the sliding block 38 is an arm 42 which extends to the exterior of the cylindrical section 31 to provide a means for manually moving the element 34 along the axis, OA, so that the distance separating the elements 34 and 36 can be selectively changed.

The cylindrical section 31 thus provides a means for positioning the elements, 34 and 36, perpendicular to the collimated light beam emerging from the reflector open end so that light from the beam can pass successively through the elements, 34 and 36, and for mounting the elements, 34 and 36, for relative movement with respect to one another along the axis, OA, which is parallel to the general direction of projection of the beam emerging from the reflector open end.

The front and rear surfaces of the elements 36 and 34 comprise a plurality of identical, parallel, horizontally extending, lenticules, 50 and 48 respectively (FIGS. 2 and 4), and the respective rear and front surfaces of the elements 36 and 34 comprise a plurality of identical, vertically extending parallel lenticules, 52 and 46 respectively (FIGS. 3 and 4). The horizontally extending lenticules, 48 and 50, have a width (see w in FIG. 4) of preferably 2 mm and the vertically extending lenticules 46 and 52 are preferably 3 mm wide. All of the aforementioned lenticules preferably comprise cylindrical lenses having a focal length, f, which is approximately 6.4 mm. The optical elements, 34 and 36, are preferably integrally molded of a suitable optical plastic in the foregoing configuration.

The optical effect of the lenticules, 46–50, on the collimated beam emerging from the reflector open end may best be understood by now referring to FIGS. 5 and 6 and examining the refracting action of individual lenticules on parallel rays which impinge upon them. When the elements 34 and 36 are separated as shown in FIG. 5, horizontally disposed rays, such as those designated by the parallel rays 54 and 56 are refracted and made to converge at a point (the focus) intermediate the vertically extending lenticules 46 and 52. Thereafter the rays 54 and 56 diverge and are recollimated by the vertically extending lenticules 52 so that they emerge from the element 36 traveling in the same direction in which they entered the element 34. The action of the horizontally extending lenticules 48 and 50 on vertically disposed rays is similar. Consequently, when the elements, 34 and 36, are separated by a distance equal to twice the focal length, f, of the individual lenticules, 46–52, the collimated light beam emerging from the reflector open end passes through the elements, 34 and 36, with substantially no change in its direction or shape. However, when the elements, 34 and 36, are brought into contact with one another as shown in FIG. 6, the rays 54 and 56 are brought to a focus at a point which is located forward of the front surface of the element 36 by a distance that is equal to the combined effective focal length, $f_c$, of individual lenticules 46 and 52. Thereafter the rays 54 and 56 diverge away from the axis, OA, at an angle, $\theta$, which can be determined by the formula shown in FIG. 6. Parallel rays in vertical planes are acted on similarly by the horizontally extending lenticules, 48 and 50.

Thus structured, the net action of all the vertically extending lenticules, 46 and 52, acting collectively, is to diverge all horizontally disposed parallel rays of the collimated light beam by an angle, $\theta_H$, in the horizontal plane when the elements 34 and 36 are in contact, and the net effect of all the horizontally extending lenticules, 48 and 50, acting collectively, is to diverge all the vertically disposed parallel rays from the collimated light beam by an angle, $\theta_V$, in a vertical plane. The illumination pattern produced by the apparatus 10 when the elements 34 and 36 are in contact is generally rectangular and is the largest rectangular area that can be illuminated by the apparatus 10. For the illustration of FIG. 8 this rectangle would correspond to the rectangle 58 whose size is determined by the angles, $\theta_H$, $\theta_V$, calculated by the formula of FIG. 6.

The amount of angular divergence of the rectangular light beam from the apparatus 10 changes in accordance with the distance separating the elements, 34 and 36. The maximum divergence in both horizontal and vertical planes occurs when the elements, 34 and 36, contact one another and, again, is determined by the formula of FIG. 6, and no divergence occurs when the distance separating the elements 34 and 36 is exactly equal to 2f. As the elements 34 and 36 are moved out of contact with one another, the amount of angular divergence of the rectangular light from the apparatus 10 decreases in correspondence with the distance separating the elements 34 and 36. The maximum separation distance between the elements, 34 and 36, is selected to be that distance at which the circular collimated light beam emerging from the reflector open end is converted to a rectangular light beam whose size, both horizontally and vertically, illuminates the smallest rectangular area desired. This would correspond to the rectangle 54 in FIG. 8.

Thus structured, the elements, 34 and 36, comprise thin, plate-like, crossed lenticular screens which are optically structured to convert the circular cross-section of the collimated beam of light emerging from the reflector open end into a beam of light having a generally rectangular cross section (FIG. 8, rectangle 56) with preselected angles of divergence, measured in mutually othogonal horizontal and vertical planes, when the elements, 34 and 36, are separated by a predetermined distance along the axis, OA, and to continuously increase the divergence of the preselected angles of the rectangularly-shaped light beam as the distance separating the elements, 34 and 36, is made smaller than the predetermined separation distance.

Additionally, it is preferable to select the focal lengths of the reflector 20 and the lenticules 46 and 48 so that the size of the image of the lamp filament 25 formed by any individual lenticule, 46 or 48, when the elements 34 and 36 are separated by their maximum distance, is smaller than the width, w, of any individual lenticule 50 and 52. In this manner, the illumination pattern formed by the apparatus 10 will be kept most efficient by avoiding extraneous areas of illumination outside of the desired rectangle.

The surface of the elements, 34 and 36, are also preferably provided with a fine texture for diffusing light by a predetermined amount to improve the uniformity of the illumination and to eliminate the possibility of forming undesirable line images of the edges formed between adjacent ones of the lenticules, 46–52. Diffusion of the elements, 34 and 36, can be provided with a well-known molding technique such as that described in U.S. Pat. No. 3,718,018 issued to William T. Plummer and entitled "Smoothly Granulated Optical Surface and Method for Making Same".

Certain changes may be made in the above-described embodiment without departing from the scope of the invention and those skilled in the art may make still other changes according to the teachings of the disclosure. For example, the spatial frequency of the lenticulated screens, 34 and 36, can be increased, i.e. finer lenticules used, to reduce the distance by which the screens, 34 and 36, need to be moved to effect the desired changes in the divergence of the light beam. In addition, the widths, w, and focal lengths, f, of the horizontal and vertical lenticules can be changed in accordance with the formula of FIG. 6 to illuminate rectangular areas having predetermined ratios of length to width. This property is particularly useful for the design of such apparatus for use with cameras having zooming optical systems which can be changed from telephoto to wide angle.

Although the operation of the light control section 26 of the invention was illustrated in connection with a collimated light beam, it is apparent that it would be effective with a non-collimated light beam as well.

Therefore, it is intended that all matter contained in the above description or shown in the accompanying drawings shall be interpreted as illustrative and not in a limiting sense.

What is claimed is:

1. Optical apparatus for selectively changing the angular spread of a projected light beam, said apparatus comprising:
    a pair of optical refracting elements; and
    means for positioning said elements in the projected light beam so that at least part of the light from the light beam can pass successively through said elements and for mounting said elements for relative movement with respect to one another along an axis parallel to the general direction of projection of the beam,
    said elements being optically structured to change the initial angular spread of the beam of light by a predetermined amount when said elements are separated by a predetermined distance along said axis and to continuously further change the initial angular spread of the beam of light as the distance separating said elements is made smaller than said predetermined separation distance.

2. The apparatus of claim 1 wherein said optical elements each comprise a thin, plate-like, lenticular screen which is mounted so that the major dimensions thereof always lie in planes that are perpendicular to said axis.

3. The apparatus of claim 2 wherein each of said lenticular screens include a first surface having a first plurality of parallel lenticules and a second oppositely facing surface having a plurality of parallel lenticules arranged at right angles to said first lenticules.

4. The apparatus of claim 1 wherein said optical elements each comprise a thin, plate-like screen each of which is mounted so that the major dimensions thereof always lie in a plane that is perpendicular to said axis, each of said screens having a first surface which faces the projected light beam and a second oppositely facing surface, a first surface of one of said screens and a second surface of another of said screens including a plurality of first identical parallel lenticules structured to control the angular spread of the light beam in a horizontal plane and the remaining surfaces of said screens including another plurality of identical parallel lenticules, arranged at right angles to said first lengitucles and structured to control the angular spread of the light beam in a vertical plane.

5. Optical apparatus for selectively diverging a collimated or nearly-collimated projected light beam having a circular cross-section, said apparatus comprising:
    a pair of optical refracting elements; and
    means for positioning said elements in the projected light beam so that light from the beam can pass successively through said elements and for mounting said elements for relative movement with respect to one another along an axis parallel to the general direction of projection of the beam,
    said elements being optically structured to convert the circular cross-section of the beam of light into a beam of light having a generally rectangular cross-section with preselected angles of divergence, measured in mutually orthogonal horizontal and vertical planes, when said elements are separated by a predetermined distance along said axis and to continuously increase the divergence of said preselected angles of said rectangularly-shaped beam as the distance separating said elements is made smaller than said predetermined separation distance.

6. The apparatus of claim 5 wherein said optical elements each comprise a thin, plate-like, crossed lenticular screen which is mounted so that the major dimensions thereof always lie in planes that are perpendicular to said axis.

7. The apparatus of claim 6 wherein each of said lenticular screens in said perpendicular planes are circular in shape.

8. The apparatus of claim 5 wherein said optical elements each comprise a thin, plate-like screen each of which is mounted so that the major dimensions thereof always lie in a plane that is perpendicular to said axis, each of said screens having a first surface which faces the projected light beam and a second oppositely facing surface, a first surface of one of said screens and a second surface of another of said screens including a plurality of first identical parallel lenticules structured to control the divergence of the light beam in said horizontal plane and the remaining surfaces of said screens including another plurality of identical parallel lenticules, arranged at right angles to said first lenticules and structured to control the divergence of the light beam in said vertical plane.

9. The apparatus of claim 8 wherein all of said lenticules comprise cylindrical lenses.

10. The apparatus of claims 6 or 8 wherein said optical elements are each integrally molded of an optical plastic.

11. The apparatus of claim 10 wherein said surfaces of said optical screens are further structured to diffuse light by a predetermined amount.

12. The apparatus of claim 8 wherein the ratio of the spatial frequency of said first lenticules to said second lenticules is 2 to 3.

13. The apparatus of claim 8 wherein each of said first lenticules is 3 mm wide and wherein each of said second lenticules is 2 mm wide, all of said lenticules having substantially the same focal length.

14. The apparatus of claim 13 wherein said focal length is approximately 6.4 mm.

15. The apparatus of claims 6 or 8 wherein one of said optical elements is fixedly mounted while the other of said optical elements is mounted for relative movement with respect thereto.

16. The apparatus of claim 15 wherein said movably mounted optical element is the first in the path of the projected light beam.

17. A zooming artificial lighting apparatus comprising:
an open-ended paraboloidal reflector;
an artificial light source mounted in said reflector, said reflector and said source being structured to cooperate to provide a collimated or nearly-collimated light beam which emerges from said reflector open end and has a circular cross-section;
a pair of optical refracting elements;
means for positioning said elements in said emerging light beam so that light from said beam can pass successively through said elements and for mounting said elements for relative movement with respect to one another along an axis parallel to the general direction of projection of said beam; and
means for facilitating the displacement of said optical elements relative to one another,
said elements being optically structured to convert the circular cross-section of said beam of light into a beam of light having a generally rectangular cross-section with preselected angles of divergence, measured in mutually orthogonal horizontal and vertical planes, when said elements are separated by a predetermined distance along said axis and to continuously increase the divergence of said preselected angles of said rectangularly-shaped light beam as the distance separating said elements is made smaller than said predetermined separation distance.

18. The apparatus of claim 17 wherein said optical elements each comprise a thin, plate-like, crossed lenticular screen which is mounted so that the major dimensions thereof always lie in planes that are perpendicular to said axis.

19. The apparatus of claim 18 wherein each of said lenticular screens in said perpendicular planes are circular in shape.

20. The apparatus of claim 17 wherein said optical elements each comprise a thin, plate-like screen each of which is mounted so that the major dimensions thereof always lie in a plane that is perpendicular to said axis, each of said screens having a first surface which faces the projected light beam and a second oppositely facing surface, a first surface of one of said screens and a second surface of another of said screens including a plurality of first identical parallel lenticules structured to control the divergence of the light beam in said horizontal plane and the remaining surfaces of said screens including another plurality of identical parallel lenticules, arranged at right angles to said first lenticules and structured to control the divergence of the light beam in said vertical plane.

21. The apparatus of claim 20 wherein all of said lenticules comprise cylindrical lenses.

22. The apparatus of claims 18 or 20 wherein said optical elements are each integrally molded of an optical plastic.

23. The apparatus of claim 22 wherein said surfaces of said optical screens are further structured to diffuse light by a predetermined amount.

24. The apparatus of claim 20 wherein the ratio of the spatial frequency of said first lenticules to said second lenticules is 2 to 3.

25. The apparatus of claim 20 wherein each of said first lenticules is 3 mm wide and wherein each of said second lenticules is 2 mm wide, all of said lenticules having substantially the same focal length.

26. The apparatus of claim 25 wherein said focal length is approximately 6.4 mm.

27. The apparatus of claims 18 or 20 wherein one of said optical elements is fixedly mounted while the other of said optical elements is mounted for relative movement with respect thereto.

28. The apparatus of claim 27 wherein said movably mounted optical element is the first in the path of the projected light beam.

* * * * *